Patented Mar. 2, 1943

2,313,027

UNITED STATES PATENT OFFICE 2,313,027

METHOD FOR RENDERING INOFFENSIVE HAIR DYES OF THE SO-CALLED OXIDATION TYPE

Eugène Schueller, Franconville, France; vested in the Alien Property Custodian

No Drawing. Application July 6, 1939, Serial No. 283,118. In France February 17, 1939

2 Claims. (Cl. 167—88)

This invention refers to means for making harmless the dyes of the so-called oxidation type the use of which is otherwise liable to produce harmful or injurious effects upon the persons brought into skin contact therewith or with emanations thereof, and has for its principal object to provide specific compositions for the purpose of making innoxious the use of such dyes.

The dyes of the so-called oxidation type which comprise certain organic compounds including phenol or amine groups liable to produce a pigment by oxidation, are at present currently used for dyeing human and animal hair, hair fabrics, leathers and the like. Among such organic compounds are phenylene-diamines, toluylene-diamines, amino-phenols, amino-diphenyl-amines and derivatives thereof.

It has been found that many persons are innately or otherwise intolerant of such compounds and thus apt to incur skin troubles through a contact of their skin with any substance which contains such compounds.

The use of said dyes will, therefore, bring into danger any person who is subject to such intolerance, it being immaterial whether the person in question be a client under treatment or a performing dyer. In particular, when such intolerance takes effect upon a performing dyer, for instance a hair-dresser or a fur-dyer, he will soon be obliged to give up his profession under pain of more and more frequent and more and more serious skin accidents.

The object of this invention is to provide means for considerably reducing and/or completely removing the aforementioned dangers resulting from the heretofore practiced use of said dyes, for both the treated party and the performing party, said means comprising specific compositions prepared from suitable materials and liable, when properly applied to the skin or epidermis of the parties in question, to protect the same from any injurious effect due to a contact with said dyes, as will hereinafter be apparent from the following statements.

Said compositions of the invention may be applied to the skin or epidermis to be protected, directly before and/or after applying said dyes thereto, or they may be incorporated into the very dyes solution for being used therewith.

The compositions of the invention are constituted substantially by a glucide or a mixture of several glucides. The expression or term "glucide," as is commonly used in the biological chemistry and as is used herein in its broad sense, comprises the group of compounds known under the denomination of "oses," "osides" and "polyalcohols," the "oses" or "monosaccharides" being non-hydrolysable reducing sugars having an aldo or keto-reducing group such as galactose, and the "osides" being the bodies that may by hydrolysis give "oses" for example "diholosides" such as maltose or lactose.

In certain cases the compositions of the invention substantially constituted as aforementioned, may comprise an alum, an alkaline chloride such as sodium chloride, or an earth-alkaline chloride such as calcium chloride, and an oxidation agent such as peroxide of hydrogen, which are admixed thereto separately or jointly. As alum, ammonium or potassium alum or iron alum or any other alum may be used.

The solutions of the components of the invention which may be used directly for protecting the epidermis or skin, may comprise preferably a glucide or a mixture of glucides, an alum and sodium chloride, eventually an oxidation agent such as peroxide of hydrogen, whilst the dyes may be treated according to the invention preferably with glucides incorporated thereinto in concentrated solutions.

The products of the invention prepared as aforementioned may be used as follows:

(a) they may be incorporated into the solution of the dye product; in this case the preferred way is to add glucides thereto at high concentration;

(b) they may be applied in aqueous solution to the epidermis or skin to be protected directly before or after the application of the dye product thereto, or they may be applied both before and after the application of said dye product.

These two ways of use involve all the aforementioned substances, i. e. glucides, preferably at high concentration, alum, sodium chloride and a peroxide.

The experience has shown that the use of said solutions of the invention, as well as the practice of said admixtures to the dye products according to the invention, have brought about a very efficient skin protection. In the case of hair-dyeing, for example, it has been demonstrated that the injurious accidents generally occur to the individuals who are intolerant of the usual dyes of the so-called oxidation type.

One convenient manner in which a hair-dyeing may be carried out substantially consists first in washing the scalp with a glucide solution comprising besides an alum, sodium chloride and peroxide of hydrogen according to the invention, then drying the scalp and applying a dyeing solution to the hair with the protecting products of the invention added to said dyeing solution, and finally when the dyeing operation is terminated washing again the scalp with a solution of the invention identical or similar to that used for the first washing.

It will be appreciated that each of the operations just described, per se produces its proper protecting effect; consequently, recourse may be had to but one or any two of said operations, whereby the risks of injurious accidents may each time be considerably reduced. But the highest protecting effect will be obtained through the three operations performed as above described.

Similarly, the operator may be efficiently protected from identical accidents through washing his hands and face before and/or after the operation, with a solution of composition of the invention identical or similar to that used for washing the scalp of his client.

What has been disclosed hereinbefore may be applied as well to dyeing furs, hair fabrics, leathers and the like, wherein the operators may be protected from injurious accidents due to the respective applications of the dye either through addition of protecting products of the invention to said dye or by washing the exposed portions of their skin with the solutions of the invention before and/or after the dyeing operation, or both.

It will be particularly noted that the use of said protecting products of the invention, far from impairing the effects of the respective dye products, on the contrary in a marked degree accelerates the dyeing process and improves the effects thereof by imparting a better lustre or brilliancy to the objects dyed with the aid of said protecting products of the invention.

For a better understanding of the invention, reference should be had to the following examples which are given merely to further illustrate the invention and are not to be construed in a limiting sense.

I. Examples of rendering inoffensive to the epidermis or skin the dyes of the so-called oxidation type by compounding the latter with protecting products according to the invention:

(a) One to two grams of lactose are vigorously agitated with a mixture of one cubic centimeter of dyestuff solution and one cubic centimeter of $H_2O_2$. The resulting product is a protective dye slurry wet enough to allow of a convenient application;

(b) One to two grams of galactose and two to three grams of lactose are vigorously agitated with a mixture of one cubic centimeter of dyestuff solution and one cubic centimeter of $H_2O_2$, resulting in a compound having a high protective power;

(c) One to two grams of highly concentrated galactose vigorously agitated with one cubic centimeter of dyestuff solution result in a dye compound of high protective power;

(d) One to four grams of highly concentrated lactose vigorously agitated with one cubic centimeter of dyestuff solution give a dye compound of high protective quality.

II. Examples of solutions according to the invention for rinsing the scalp or washing operator's face and hands for the purpose of protecting the same from injurious effects due to the dyes of the so-called oxidation type:

(a) 80 grams of galactose diluted in a sufficient quantity of water to make 1 litre of protective solution;

(b) 100 grams of lactose diluted in a sufficient quantity of water to make 1 litre of protective solution;

(c) 30 to 50 grams of galactose and 100 grams of lactose diluted in a sufficient quantity of water to make 1 litre of protective solution;

(d) 100 grams of galactose or lactose, or a mixture thereof in the ratio of about 1:3, and 50 c. c. of 20 vol. peroxide of hydrogen diluted in a sufficient quantity of water to make 1 litre of protective solution;

(e) 100 grams of galactose or lactose and 90 grams of alum dissolved in a sufficient quantity of water to make 1 litre of protecting solution;

(f) 80 grams of galactose and 150 grams of sodium chloride dissolved in a sufficient quantity of water to make 1 litre of protecting solution;

(g) 100 grams of lactose, 90 grams of sodium chloride and 50 c. c. of 20 vol. peroxide of hydrogen made up to 1 litre of protecting solution;

(h) 100 grams of lactose, 90 grams of alum and 150 grams of sodium chloride made up to 1 litre of protecting solution;

(i) 100 grams of lactose, 90 grams of alum, 150 grams of sodium chloride and 50 c. c. of 20 vol. peroxide of hydrogen made up to 1 litre of protecting solution.

It is to be understood that the invention is not limited to the particular embodiments illustrated and described, for modifications in details may be effected without departing from the spirit of the invention especially as defined in the appended claims. The expression "dyes of the so-called oxidation type" when employed in the hereunder appended claims is restricted to dyes containing either an amine or phenol group or groups or both groups.

What I claim is:

1. A method of protecting live epidermis or skin from injurious effects due to the dye of the so-called oxidation type used in hair dyeing, consisting in rinsing the scalp first with a solution containing a glucide, an alum, a salt selected from the group consisting of alkali metal and alkaline earth metal chlorides, and an oxidation agent, and subsequently applying to the hair a dyestuff solution of the so-called oxidation type dye containing the same protecting compounds as in the said first solution.

2. A method of hair-dyeing comprising rinsing the scalp with a solution for protecting live epidermis or skin from injurious effects due to the dyes of the so-called oxidation type, said solution containing a glucide, an alum, a salt selected from the group consisting of alkali metal and alkaline earth metal chlorides, and an oxidation agent, applying to the hair a dyestuff solution of the so-called oxidation type dye, containing the same protective compounds as in the said first solution and rinsing the scalp again with the first solution.

EUGÈNE SCHUELLER.